United States Patent
Saadi et al.

(10) Patent No.: US 11,924,770 B2
(45) Date of Patent: Mar. 5, 2024

(54) ENHANCED UPLINK POWER CONTROL WITH LOOKAHEAD

(71) Applicant: QUALCOMM Incorporated, San Diego, CA (US)

(72) Inventors: Brahim Saadi, Nuremberg (DE); Dinesh Kumar Devineni, San Diego, CA (US); Rajeev Malasani, San Diego, CA (US); Anoop Ramakrishna, San Diego, CA (US); Ruhua He, San Diego, CA (US); Enoch Shiao-Kuang Lu, San Diego, CA (US); Raghu Narayan Challa, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 115 days.

(21) Appl. No.: 17/367,247

(22) Filed: Jul. 2, 2021

(65) Prior Publication Data
US 2023/0007594 A1    Jan. 5, 2023

(51) Int. Cl.
| | |
|---|---|
| *H04B 7/185* | (2006.01) |
| *H04W 52/14* | (2009.01) |
| *H04W 52/36* | (2009.01) |
| *H04W 72/044* | (2023.01) |
| *H04W 72/0446* | (2023.01) |

(Continued)

(52) U.S. Cl.
CPC ....... *H04W 52/146* (2013.01); *H04W 52/367* (2013.01); *H04W 72/0446* (2013.01); *H04W 72/0453* (2013.01); *H04W 72/0473* (2013.01); *H04W 72/56* (2023.01)

(58) Field of Classification Search
CPC ............. H04W 52/146; H04W 52/367; H04W 72/0446; H04W 72/0453; H04W 72/0473; H04W 72/56; H04W 52/247; H04W 52/281; H04W 52/362; H04W 52/24; H04W 52/50; H04W 52/16; H04W 52/12
See application file for complete search history.

(56) References Cited

U.S. PATENT DOCUMENTS

| | | | |
|---|---|---|---|
| 9,113,467 B2 * | 8/2015 | Yang | H04W 52/146 |
| 9,380,544 B2 * | 6/2016 | Larsson | H04W 52/52 |
| 9,603,099 B2 | 3/2017 | Shin et al. | |

(Continued)

FOREIGN PATENT DOCUMENTS

| | | | | |
|---|---|---|---|---|
| AU | 2009210374 A1 * | 9/2009 | | D03C 13/025 |
| WO | 2015108359 A1 | 7/2015 | | |

*Primary Examiner* — Phuongchau Ba Nguyen
(74) *Attorney, Agent, or Firm* — Procopio, Cory, Hargreaves & Savitch

(57) ABSTRACT

A UE may calculate an allocation of a transmission power for a first uplink transmission on a first uplink channel and at least one second uplink transmission on at least one second uplink channel, the transmission power being allocated in each symbol of a plurality of symbols in a slot. The UE may detect a transmission power change in the allocation of the transmission power in the slot for at least one of the first uplink transmission or the at least one second uplink transmission. The UE may determine whether to adjust the allocation of the transmission power for the at least one of the first uplink transmission or the at least one second uplink transmission to eliminate the transmission power change in the slot for the at least one of the first uplink transmission or the at least one second uplink transmission.

31 Claims, 12 Drawing Sheets

(51) Int. Cl.
*H04W 72/0453* (2023.01)
*H04W 72/56* (2023.01)

(56) References Cited

U.S. PATENT DOCUMENTS

| | | | |
|---|---|---|---|
| 10,568,041 B2* | 2/2020 | MolavianJazi | H04W 72/21 |
| 10,873,912 B2* | 12/2020 | Zhou | H04W 74/0833 |
| 2006/0078059 A1* | 4/2006 | Ok | H04L 5/0044 |
| | | | 375/260 |
| 2007/0291702 A1* | 12/2007 | Nanba | H04J 3/00 |
| | | | 370/336 |
| 2012/0008563 A1 | 1/2012 | Johansson et al. | |
| 2013/0058315 A1* | 3/2013 | Feuersanger | H04W 52/346 |
| | | | 370/336 |
| 2013/0143614 A1* | 6/2013 | Lee | H04W 52/247 |
| | | | 455/509 |
| 2013/0322364 A1* | 12/2013 | Tsai | H04W 52/24 |
| | | | 370/329 |
| 2014/0098726 A1* | 4/2014 | Kang | H04W 52/545 |
| | | | 370/311 |
| 2016/0050634 A1* | 2/2016 | Seok | H04W 52/146 |
| | | | 370/338 |
| 2020/0022086 A1* | 1/2020 | Yu | H04W 52/146 |
| 2020/0053659 A1* | 2/2020 | Wang | H04W 52/365 |
| 2020/0374882 A1 | 11/2020 | Cai et al. | |
| 2021/0022132 A1* | 1/2021 | Park | H04W 72/0473 |
| 2021/0160787 A1* | 5/2021 | Zhou | H04W 8/24 |
| 2021/0345254 A1* | 11/2021 | Zhou | H04W 52/367 |
| 2022/0338136 A1* | 10/2022 | Xing | H04W 52/146 |

\* cited by examiner

ENHANCED UPLINK POWER CONTROL WITH LOOKAHEAD

TECHNICAL FIELD

The present disclosure relates generally to communication systems, and more particularly, to wireless communication that includes uplink power control in a multiple channel scenario.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may calculate an allocation of a transmission power for a first uplink transmission on a first uplink channel and at least one second uplink transmission on at least one second uplink channel. The transmission power may be allocated in each symbol of a plurality of symbols in a slot. The apparatus may detect a transmission power change in the allocation of the transmission power in the slot for at least one of the first uplink transmission or the at least one second uplink transmission. The transmission power change may be associated with an overlapping between the first uplink transmission and the at least one second uplink transmission over at least a portion of one symbol in the slot. The apparatus may determine whether to adjust the allocation of the transmission power for the at least one of the first uplink transmission or the at least one second uplink transmission to eliminate the transmission power change in the slot for the at least one of the first uplink transmission or the at least one second uplink transmission. The apparatus may transmit, to a base station, the at least one of the first uplink transmission on the first uplink channel or the at least one second uplink transmission on the at least one second uplink channel based on an adjusted or an unadjusted allocation of the transmission power based on the determination.

In an aspect of the disclosure, a method, a computer-readable medium, and an apparatus are provided. The apparatus may be a base station. The apparatus may transmit, to a UE, for each of plurality of uplink channels, at least one of a channel priority or an indication of a requested transmission power. The channel priority may be associated with a transmission power of each of the plurality of uplink channels. The plurality of uplink channels may include a first uplink channel and at least one second uplink channel. The apparatus may receive, from the UE, at least one of a first uplink transmission on the first uplink channel or at least one second uplink transmission on the at least one second uplink channel. The at least one of the first uplink transmission or the at least one second uplink transmission may be received based on the at least one of the channel priority or the indication of the requested transmission power and based on an adjustment or a non-adjustment of an allocation of a transmission power for the at least one of the first uplink transmission or the at least one second uplink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
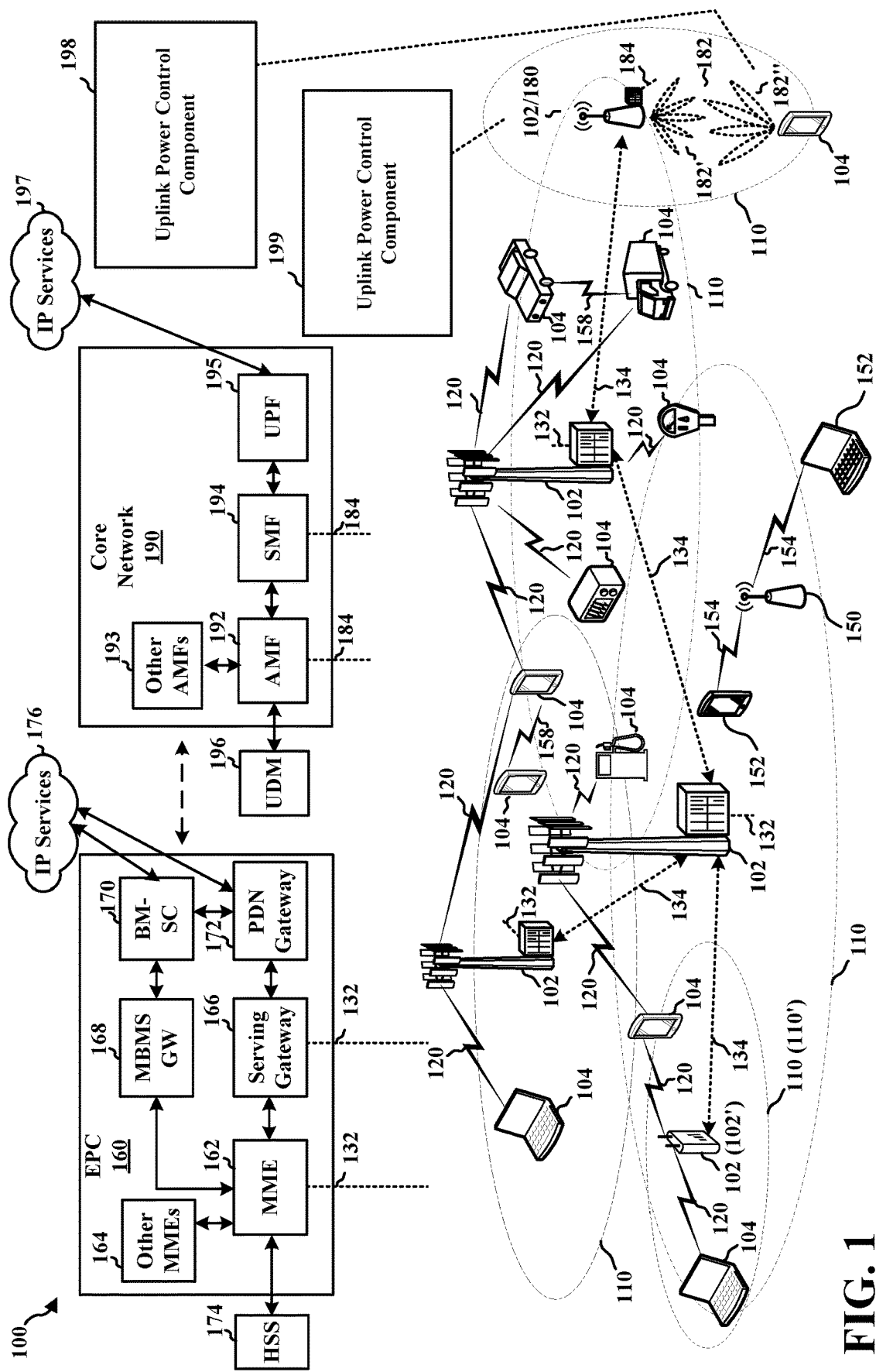
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an uplink power control component 198 that may be configured to calculate an allocation of a transmission power for a first uplink transmission on a first uplink channel and at least one second uplink transmission on at least one second uplink channel. The transmission power may be allocated in each symbol of a plurality of symbols in a slot. The uplink power control component 198 may be configured to detect a transmission power change in the allocation of the transmission power in the slot for at least one of the first uplink transmission or the at least one second uplink transmission. The transmission power change may be associated with an overlapping between the first uplink transmission and the at least one second uplink transmission over at least a portion of one symbol in the slot. The uplink power control component 198 may be configured to determine whether to adjust the allocation of the transmission power for the at least one of the first uplink transmission or the at least one second uplink transmission to eliminate the transmission power change in the slot for the at least one of the first uplink transmission or the at least one second uplink transmission. The uplink power control component 198 may be configured to transmit, to a base station, the at least one of the first uplink transmission on the first uplink channel or the at least one second uplink transmission on the at least one second uplink channel based on an adjusted or an unadjusted allocation of the transmission power based on the determination. In certain aspects, the base station 180 may include an uplink power control component 199 that may be configured to transmit, to a UE, for each of a plurality of uplink channels, at least one of a channel priority or an indication of a requested transmission power. The channel priority may be associated with a transmission power of each of the plurality of uplink channels. The plurality of uplink channels may include a first uplink channel and at least one second uplink channel. The uplink power control component 199 may be configured to receive, from the UE, at least one of a first uplink transmission on the first uplink channel or at least one second uplink transmission on the at least one second uplink channel. The at least one of the first uplink transmission or the at least one second uplink transmission may be received based on the at least one of the channel priority or the indication of the requested transmission power and based on an adjustment or a non-adjustment of an allocation of a transmission power for the at least one of the first uplink transmission or the at least one second uplink transmission. Although the following description may be focused on 5G NR, the concepts described herein may be applicable to other similar areas, such as LTE, LTE-A, CDMA, GSM, and other wireless technologies.

Figure 2:
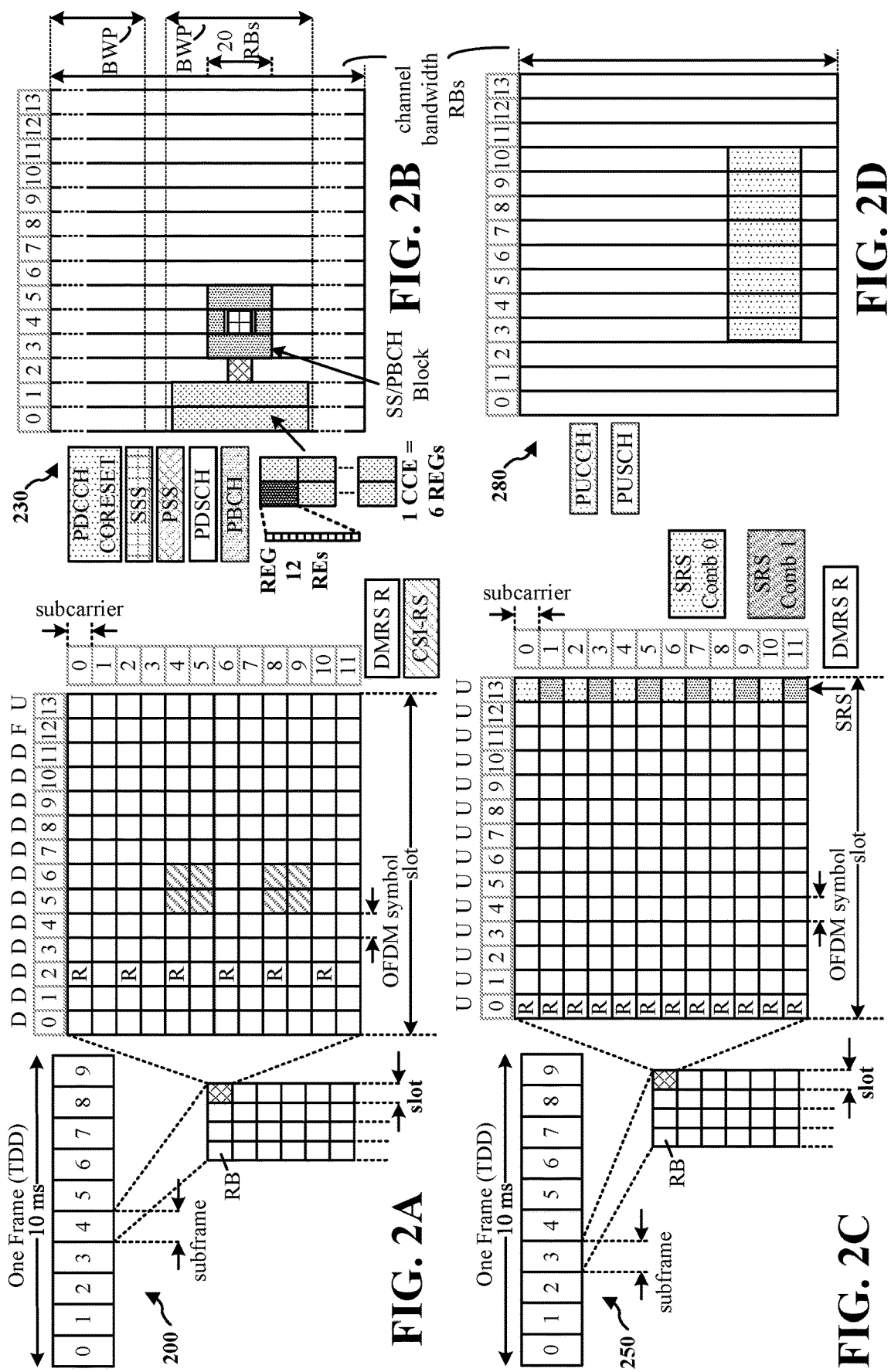
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe.

The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
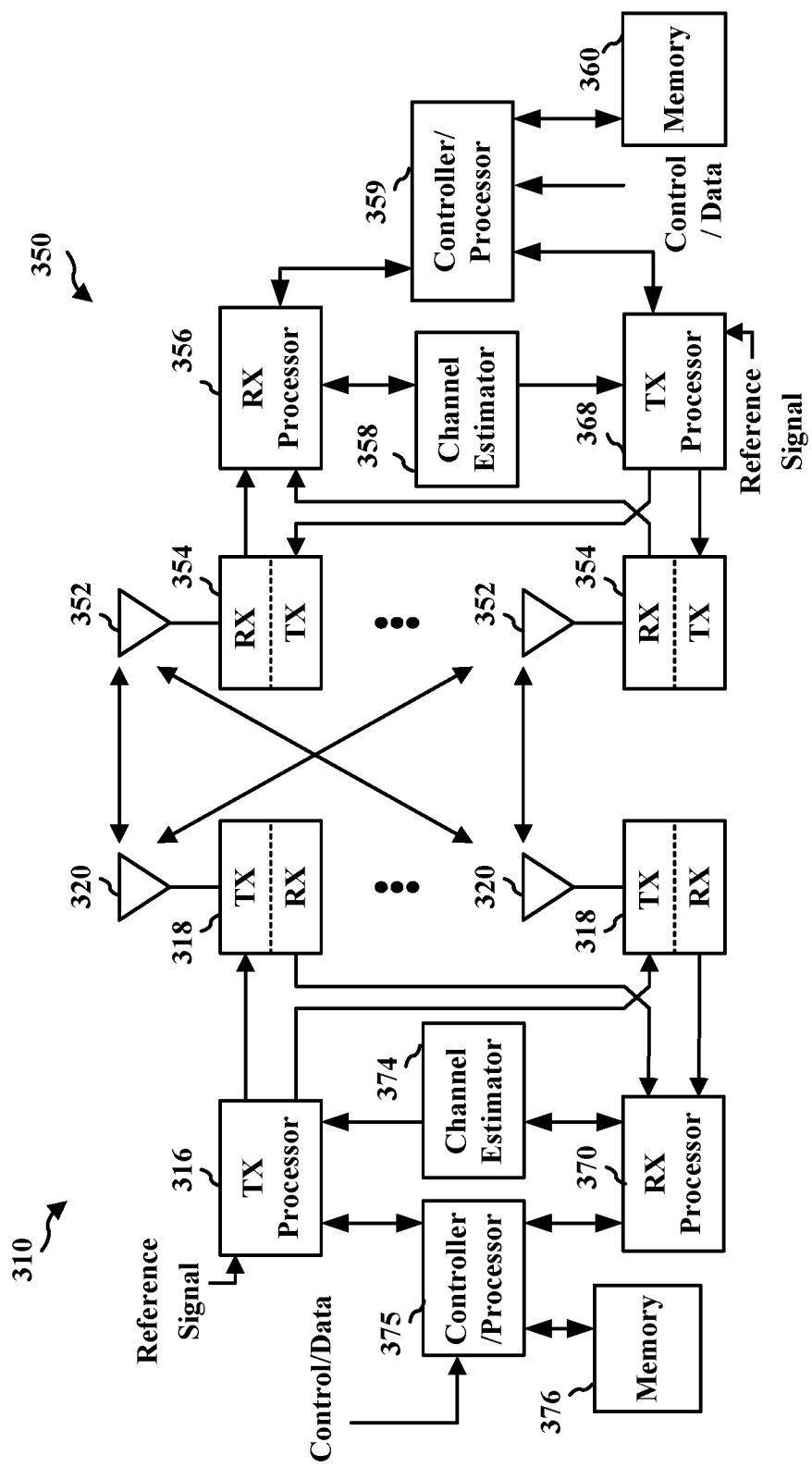
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Aspects described herein may relate to use cases where uplink carrier aggregation is utilized. Changing the transmission power within a slot during an active channel transmission may cause multiple issues. For example, channel estimation may not work for modulation schemes with higher orders than QPSK (e.g., M-QAM) due to the constellation scaling. Further, the channel discontinuity due to a power amplifier gain change may cause the constellation to rotate. Both of these effects may cause demodulation to fail, and the channel may likely be non-decodable.

The initial transmission power allocation for the channel transmissions on the multiple CCs including an allocation of the transmission power for each of the symbols may be performed using known methods. For example, the transmission power allocation across the multiple CCs may be based on at least one of the priorities associated with the channel transmissions on the CCs or indications received from the network of requested transmission power levels associated with the channel transmissions on the CCs.

Figure 4:
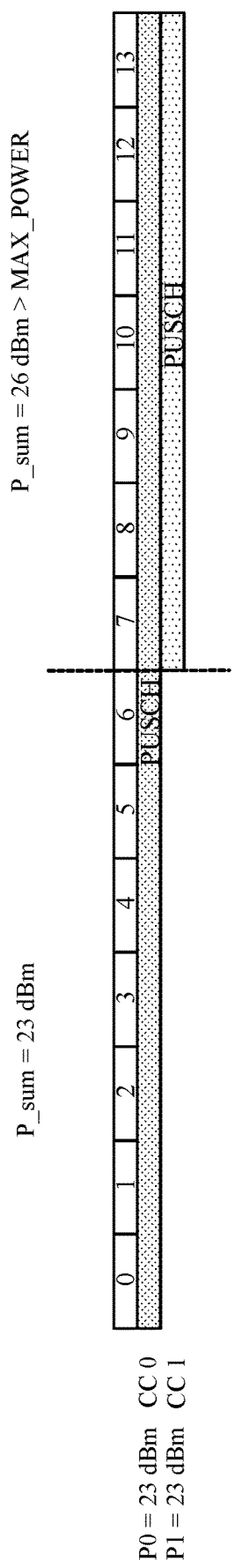
FIG. 4 is a diagram illustrating uplink transmission power allocation across multiple CCs.

FIG. 4 is a diagram 400 illustrating uplink transmission power allocation across multiple component carriers (CCs). The transmission power allocated for the channel transmission on CC 0 may be 23 decibel-milliwatts (dBm) when there is no overlapping transmission on other CCs. The channel transmissions on CC 0 and CC 1 may be associated with the same priority (or not, right?). For symbols 7 to 13 in the illustrated slot, channel transmissions on CC 0 and CC 1 may overlap. However, if the channel transmissions on CC 0 and CC 1 are each transmitted with the 23 dBm transmission power for symbols 7 to 13, the total transmission power (i.e., 26 dBm) may exceed the transmission power limit of the UE (e.g., 23 dBm) based on the UE power class. To keep the total transmission power within the limit, the transmission power for the channel transmissions on CC 0 and CC 1 for symbols 7 to 13 may be scaled down.

Figure 5:
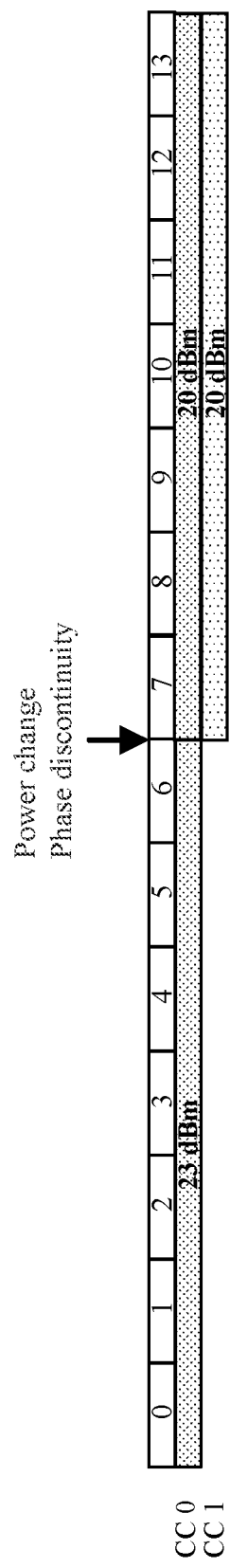
FIG. 5 is a diagram illustrating uplink transmission power allocation across multiple CCs.

FIG. 5 is a diagram 500 illustrating uplink transmission power allocation across multiple CCs. Because channel transmissions on CC 0 and CC 1 are associated with the same priority, the total allowable transmission power (e.g., 23 dBm) may be equally allocated to each of the channel transmissions on CC 0 and CC 1 for symbols 7 to 13. Accordingly, each of the channel transmissions on CC 0 and CC 1 may be transmitted with 20 dBm transmission power for symbols 7 to 13. Due to the power allocation for symbols 7 to 13, a transmission power change may occur on the channel transmission on CC 0 at the boundary between symbol 6 and symbol 7. The transmission power change may cause phase discontinuity, and may cause the channel on CC 0 to be non-decodable for symbols 7 to 13.

Figure 6:
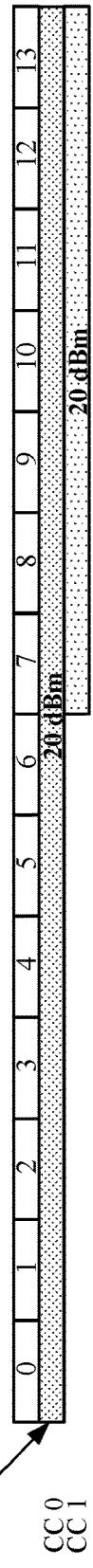
FIG. 6 is a diagram illustrating uplink transmission power allocation across multiple CCs according to aspects of the disclosure.

FIG. 6 is a diagram 600 illustrating uplink transmission power allocation across multiple CCs according to aspects of the disclosure. The initial transmission power allocation for the channel transmissions on the multiple CCs including an allocation of the transmission power for each of the symbols may be performed using known methods. For example, the transmission power allocation across the multiple CCs may be based on at least one of the priorities associated with the channel transmissions on the CCs or indications received from the network of requested transmission power levels associated with the channel transmissions on the CCs. In one aspect, before the first symbol of the slot (i.e., symbol 0) is transmitted, the UE may search through the initial transmission power allocation for the slot for each of the CCs to find any in-slot transmission power change on any CC. For example, for CC 0, the UE may find the transmission power change from 23 dBm to 20 dBm at the boundary between symbol 6 and symbol 7, as described above. In one configuration, the UE may adjust the transmission power allocation to reduce the transmission power for some of the symbols for the CCs that are associated with a transmission power change, so that the in-slot transmission power change may be eliminated and the channel transmission on the CC may be transmitted with a same and constant transmission power throughout the duration of the channel transmission (e.g., the entire slot). In one aspect, a minimum transmission power allocated to the channel transmission on the CC for some of the symbols may be used instead for the channel transmission on the CC for the duration of the channel transmission (e.g., the entire slot). In the illustrated example, the transmission power for the channel transmission on CC 0 for symbols 0 to 6 may be reduced to 20 dBm from 23 dBm. Accordingly, the transmission power for the channel transmission on CC 0 may be transmitted with the same 20 dBm transmission power throughout the duration of the channel transmission (e.g., the entire slot). Because the transmission power change is eliminated, the channel may be decodable throughout the slot. In another example (not shown), the channel transmission on CC 0 may overlap in time with an additional channel transmission on an additional CC (e.g., CC 2), and may be associated with two transmission power changes in the slot. Based on the initial transmission power allocation, the channel transmission on CC 0 may be transmitted with a 23 dBm transmission power for some symbols, with a 20 dBm transmission power for some other symbols, and with a 17 dBm transmission power for yet some other symbols. According to the aspects described herein, the transmission power allocation may be adjusted so that the constant 17 dBm transmission power (i.e., the minimum transmission power allocated to the channel transmission on CC 0) may be used instead for the channel transmission on CC 0 throughout the duration of the channel transmission (e.g., the entire slot). As the transmission power changes are eliminated, and the transmission power is not excessively reduced for any symbol, the channel transmission may be decodable for the entire slot.

Although aspects are described in relation to CC 0, they may be applied similarly to other CCs (e.g., CC 1, CC 2, etc.). Further, the number of simultaneous channel transmissions and the number of the in-slot transmission power changes on a CC do not limit the disclosure.

An adjusted transmission power allocation that is non optimal may not be used for the channel transmissions. In one configuration, if the power reduction for the channel transmission on one CC based on an adjusted transmission power allocation exceeds a first threshold (e.g., 5 dB, 10 dB, 15 dB, 18 dB, 20 dB, etc.), the initial transmission power allocation may not be adjusted, and the unadjusted initial transmission power allocation may be used for the channel transmissions. For example, if, based on the initial transmission power allocation, the channel transmission on one CC is to be transmitted with a 23 dBm transmission power for some symbols, with a 20 dBm transmission power for some other symbols, and with a 3 dBm transmission power for yet some other symbols, using a minimum transmission power allocated to the channel transmission on the CC (i.e., 3 dBm) for the channel transmission for the entire slot may involve a first transmission power reduction of 20 dB and a second transmission power reduction of 17 dB. With such large transmission power reductions, even if the transmission power changes are eliminated, decoding failures may occur nonetheless. Accordingly, if a first threshold that is less than 20 dB is utilized, the initial transmission power allocation may not be adjusted, and the unadjusted initial transmission power allocation may be used for the channel transmission on the CC. In another example (not shown), based on the initial transmission power allocation, the channel transmission on one CC may be transmitted with a 20 dBm transmission power for some symbols and with a $-\infty$ dBm transmission power for some other symbols. Using a minimum transmission power allocated to the channel transmission on the CC (i.e., $-\infty$ dBm) for the channel transmission for the entire slot may result in a non-transmission of the whole channel. As the power reduction exceeds the first threshold, the initial transmission power allocation may not be adjusted, and the unadjusted initial transmission power allocation may be used for the channel transmission on the CC. Accordingly, the channel may still be decodable in symbols where the channel transmission is transmitted with the initially allocated 20 dBm transmission power.

In one configuration, if the proportion of symbols in the slot whose decoding may be affected by the transmission power changes is less than a second threshold (e.g., 10%, 15%, etc.), the initial transmission power allocation may not be adjusted, and the unadjusted initial transmission power allocation may be used for the channel transmissions. Intuitively, for example, the full channel power may not be reduced just because the decoding of a single symbol may be affected by a transmission power change. Compared to the example illustrated in FIGS. 4-6, if the transmission power change occurs at the boundary between symbol 12 and symbol 13, the decoding of symbol 13 may be affected, while the decoding of symbols 0 to 12 may not be affected by the transmission power change. If the proportion of symbols in the channel transmission whose decoding may be affected by the transmission power changes (e.g., 1/14) is less than the second threshold (e.g., 10%, 15%, etc.), the initial transmission power allocation may not be adjusted, and the unadjusted initial transmission power allocation may be used for the channel transmissions. In some aspects, a channel error correcting code (e.g., a low-density parity-check "LDPC" code) may help to correct the errors resulting from the power discontinuity. In some aspects, the data associated with the decoding errors may be retransmitted (e.g., based on the HARQ process).

Figure 7:
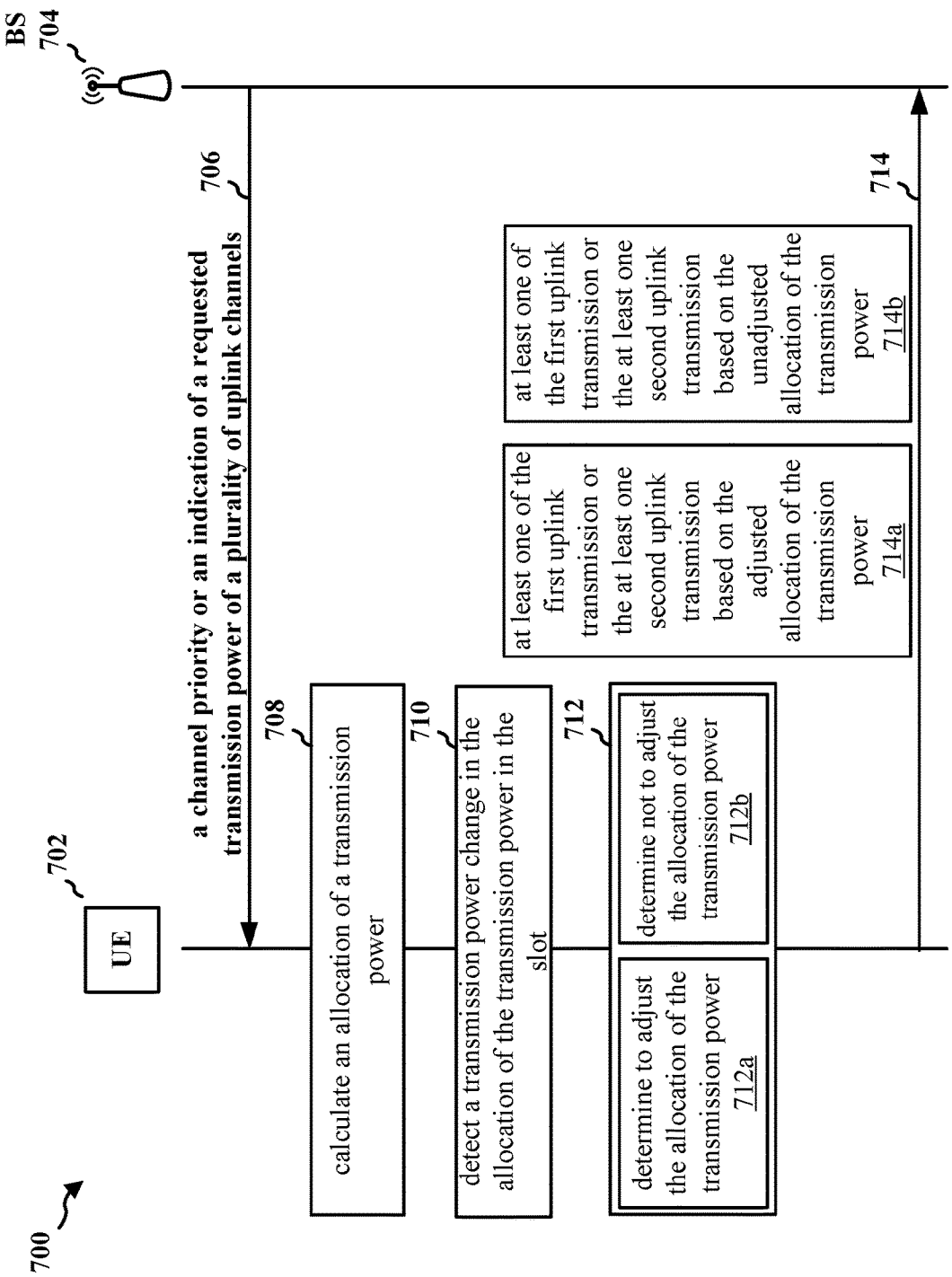
FIG. 7 is a communication flow of a method of wireless communication.

FIG. 7 is a communication flow 700 of a method of wireless communication. At 706, the base station 704 may transmit to the UE 702, and the UE 702 may receive from the base station 704, for each of a plurality of uplink channels, at least one of a channel priority or an indication of a requested transmission power. The channel priority may be associated with a transmission power of each of the plurality of uplink channels. The plurality of uplink channels may include the first uplink channel and the at least one second uplink channel.

At 708, the UE 702 may calculate an allocation of a transmission power for a first uplink transmission on a first uplink channel and at least one second uplink transmission on at least one second uplink channel. The transmission power may be allocated in each symbol of a plurality of symbols in a slot. The transmission power may be allocated based on the at least one of the channel priority or the indication of the requested transmission power. The first uplink transmission may correspond to at least one first CC on the first uplink channel and the at least one second uplink transmission may correspond to at least one second CC on the at least one second uplink channel.

At 710, the UE 702 may detect a transmission power change in the allocation of the transmission power in the slot for at least one of the first uplink transmission or the at least one second uplink transmission. The transmission power change may be associated with an overlapping between the first uplink transmission and the at least one second uplink transmission over at least a portion of one symbol in the slot.

At 712, the UE 702 may determine whether to adjust the allocation of the transmission power for the at least one of the first uplink transmission or the at least one second uplink transmission to eliminate the transmission power change in the slot for the at least one of the first uplink transmission or the at least one second uplink transmission.

At 714, the UE 702 may transmit to the base station 704, and the base station 704 may receive from the UE 702, the at least one of the first uplink transmission on the first uplink channel or the at least one second uplink transmission on the at least one second uplink channel based on an adjusted or an unadjusted allocation of the transmission power based on the determination.

At 712a, the UE 702 may determine to adjust the allocation of the transmission power for the at least one of the first uplink transmission or the at least one second uplink transmission to eliminate the transmission power change in the slot for the at least one of the first uplink transmission or the at least one second uplink transmission. At 714a, the UE 702 may transmit, to the base station 704, the at least one of the first uplink transmission on the first uplink channel or the at least one second uplink transmission on the at least one second uplink channel based on the adjusted allocation of the transmission power. The transmission power for at least one symbol in the slot for the at least one of the first uplink transmission or the at least one second uplink transmission may be reduced based on the adjustment to eliminate the transmission power change in the slot for the at least one of the first uplink transmission or the at least one second uplink transmission. In one configuration, the transmission power for the at least one of the first uplink transmission or the at least one second uplink transmission throughout the slot may be equal to a minimum transmission power for the at least one of the first uplink transmission or the at least one second uplink transmission in the unadjusted allocation of the transmission power.

When the adjustment is associated with a transmission power reduction that is above a first threshold, at 712b, the UE 702 may determine not to adjust the allocation of the transmission power for the at least one of the first uplink transmission or the at least one second uplink transmission. The transmission power reduction may correspond to at least a portion of the at least one of the first uplink transmission or the at least one second uplink transmission. At 714b, the UE 702 may transmit, to the base station 704, the at least one of the first uplink transmission on the first uplink channel or the at least one second uplink transmission on the at least one second uplink channel based on the unadjusted allocation of the transmission power.

When a proportion of the plurality of symbols affected by the transmission power change in the at least one of the first uplink transmission or the at least one second uplink transmission is below a second threshold, at 712b, the UE 702 may determine not to adjust the allocation of the transmission power for the at least one of the first uplink transmission or the at least one second uplink transmission. At 714b, the UE 702 may transmit, to the base station 704, the at least one of the first uplink transmission on the first uplink channel or the at least one second uplink transmission on the at least one second uplink channel based on the unadjusted allocation of the transmission power.

Figure 8:
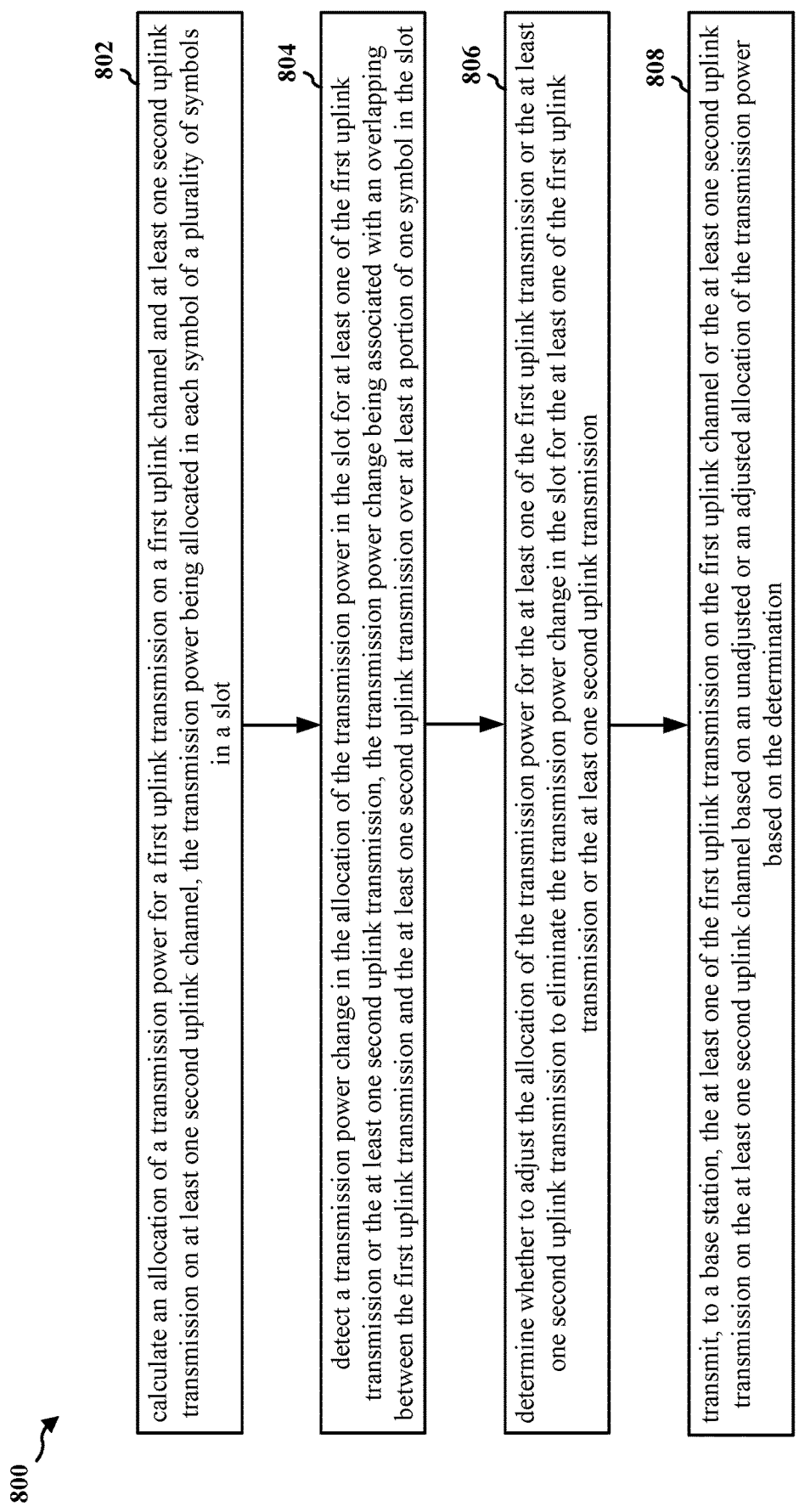
FIG. 8 is a flowchart of a method of wireless communication.

FIG. 8 is a flowchart 800 of a method of wireless communication. The method may be performed by a UE (e.g., the UE 104/350/702; the apparatus 1102). At 802, the UE may calculate an allocation of a transmission power for a first uplink transmission on a first uplink channel and at least one second uplink transmission on at least one second uplink channel. The transmission power may be allocated in each symbol of a plurality of symbols in a slot. For example, 802 may be performed by the uplink power control component 1140 in FIG. 11. Referring to FIG. 7, at 708, the UE 702 may calculate an allocation of a transmission power for a first uplink transmission on a first uplink channel and at least one second uplink transmission on at least one second uplink channel.

At 804, the UE may detect a transmission power change in the allocation of the transmission power in the slot for at least one of the first uplink transmission or the at least one second uplink transmission. The transmission power change may be associated with an overlapping between the first uplink transmission and the at least one second uplink transmission over at least a portion of one symbol in the slot. For example, 804 may be performed by the uplink power control component 1140 in FIG. 11. Referring to FIG. 7, at 710, the UE 702 may detect a transmission power change in the allocation of the transmission power in the slot for at least one of the first uplink transmission or the at least one second uplink transmission.

At 806, the UE may determine whether to adjust the allocation of the transmission power for the at least one of the first uplink transmission or the at least one second uplink transmission to eliminate the transmission power change in the slot for the at least one of the first uplink transmission or the at least one second uplink transmission. For example, 806 may be performed by the uplink power control component 1140 in FIG. 11. Referring to FIG. 7, at 712, the UE 702 may determine whether to adjust the allocation of the transmission power for the at least one of the first uplink transmission or the at least one second uplink transmission to eliminate the transmission power change in the slot for the at least one of the first uplink transmission or the at least one second uplink transmission.

At 808, the UE may transmit, to a base station, the at least one of the first uplink transmission on the first uplink channel or the at least one second uplink transmission on the at least one second uplink channel based on an adjusted or an unadjusted allocation of the transmission power based on the determination. For example, 808 may be performed by the uplink power control component 1140 in FIG. 11. Referring to FIG. 7, at 714, the UE 702 may transmit, to a base station 704, the at least one of the first uplink transmission on the first uplink channel or the at least one second uplink transmission on the at least one second uplink channel based on an adjusted or an unadjusted allocation of the transmission power based on the determination.

Figure 9:
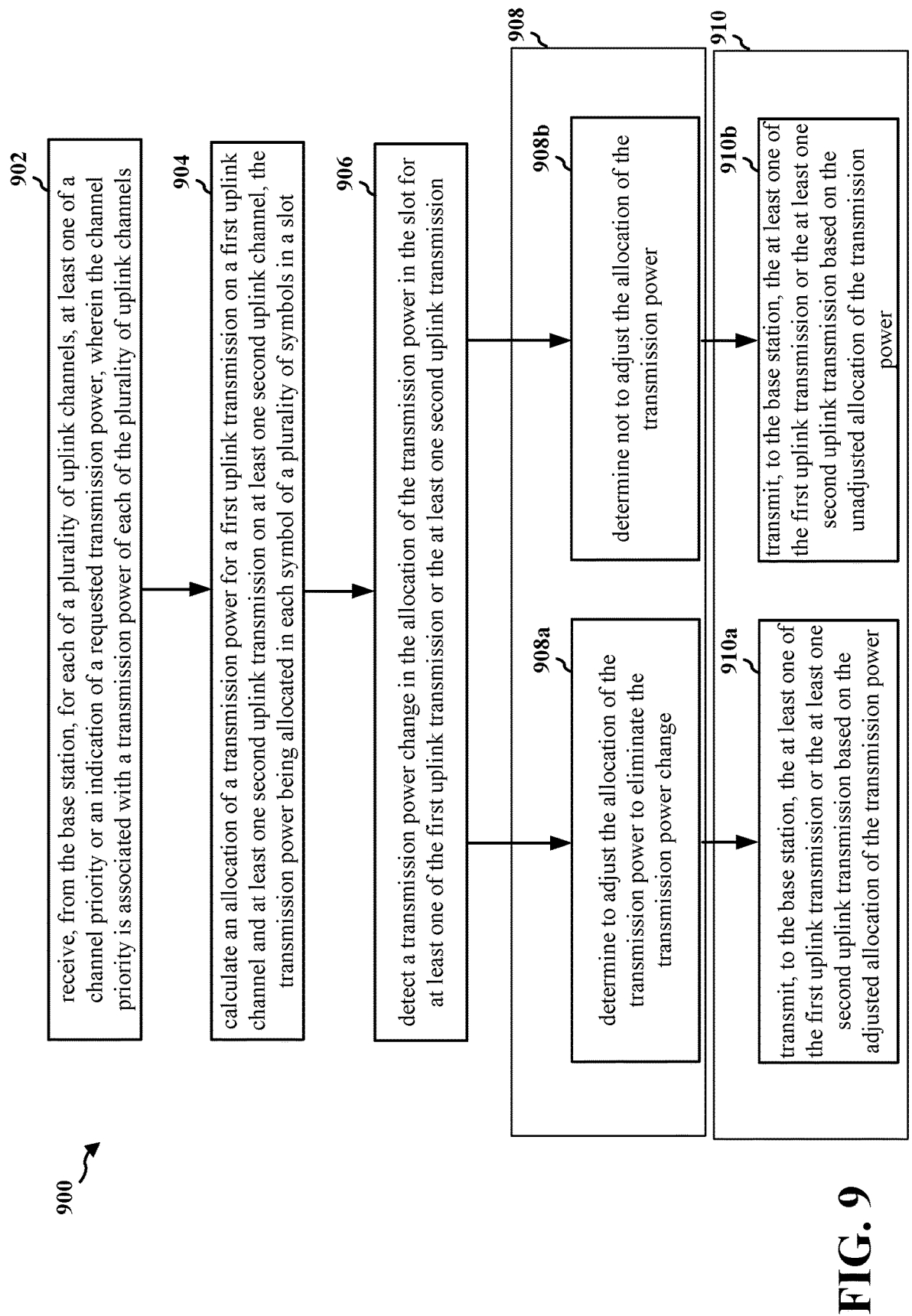
FIG. 9 is a flowchart of a method of wireless communication.

FIG. 9 is a flowchart 900 of a method of wireless communication. The method may be performed by a UE (e.g., the UE 104/350/702; the apparatus 1102). At 904, the UE may calculate an allocation of a transmission power for a first uplink transmission on a first uplink channel and at least one second uplink transmission on at least one second uplink channel. The transmission power may be allocated in each symbol of a plurality of symbols in a slot. For example, 904 may be performed by the uplink power control component 1140 in FIG. 11. Referring to FIG. 7, at 708, the UE 702 may calculate an allocation of a transmission power for a first uplink transmission on a first uplink channel and at least one second uplink transmission on at least one second uplink channel.

At 906, the UE may detect a transmission power change in the allocation of the transmission power in the slot for at least one of the first uplink transmission or the at least one second uplink transmission. The transmission power change may be associated with an overlapping between the first uplink transmission and the at least one second uplink transmission over at least a portion of one symbol in the slot. For example, 906 may be performed by the uplink power control component 1140 in FIG. 11. Referring to FIG. 7, at 710, the UE 702 may detect a transmission power change in the allocation of the transmission power in the slot for at least one of the first uplink transmission or the at least one second uplink transmission.

At 908, the UE may determine whether to adjust the allocation of the transmission power for the at least one of the first uplink transmission or the at least one second uplink transmission to eliminate the transmission power change in the slot for the at least one of the first uplink transmission or the at least one second uplink transmission. For example, 908 may be performed by the uplink power control component 1140 in FIG. 11. Referring to FIG. 7, at 712, the UE 702 may determine whether to adjust the allocation of the transmission power for the at least one of the first uplink transmission or the at least one second uplink transmission to eliminate the transmission power change in the slot for the at least one of the first uplink transmission or the at least one second uplink transmission.

At 910, the UE may transmit, to a base station, the at least one of the first uplink transmission on the first uplink channel or the at least one second uplink transmission on the at least one second uplink channel based on an adjusted or an unadjusted allocation of the transmission power based on the determination. For example, 910 may be performed by the uplink power control component 1140 in FIG. 11. Referring to FIG. 7, at 714, the UE 702 may transmit, to a base station 704, the at least one of the first uplink transmission on the first uplink channel or the at least one second uplink transmission on the at least one second uplink channel based on an adjusted or an unadjusted allocation of the transmission power based on the determination.

In one configuration, at 902, the UE may receive, from the base station, for each of a plurality of uplink channels, at least one of a channel priority or an indication of a requested transmission power. The channel priority may be associated with a transmission power of each of the plurality of uplink channels. The plurality of uplink channels may include the first uplink channel and the at least one second uplink channel. For example, 902 may be performed by the uplink power control component 1140 in FIG. 11. Referring to FIG. 7, at 706, the UE 702 may receive, from the base station 704, a channel priority of a plurality of uplink channels.

In one configuration, the transmission power may be allocated based on the at least one of the channel priority or the indication of the requested transmission power.

In one configuration, the first uplink transmission may correspond to at least one first CC on the first uplink channel and the at least one second uplink transmission may correspond to at least one second CC on the at least one second uplink channel.

In one configuration, at 908*a*, the UE may determine to adjust the allocation of the transmission power for the at least one of the first uplink transmission or the at least one second uplink transmission to eliminate the transmission power change in the slot for the at least one of the first uplink transmission or the at least one second uplink transmission. For example, 908*a* may be performed by the uplink power control component 1140 in FIG. 11. Referring to FIG. 7, at 712*a*, the UE 702 may determine to adjust the allocation of the transmission power for the at least one of the first uplink transmission or the at least one second uplink transmission to eliminate the transmission power change in the slot for the at least one of the first uplink transmission or the at least one second uplink transmission.

At 910*a*, the UE may transmit, to the base station, the at least one of the first uplink transmission on the first uplink channel or the at least one second uplink transmission on the at least one second uplink channel based on the adjusted allocation of the transmission power. The transmission power for at least one symbol in the slot for the at least one of the first uplink transmission or the at least one second uplink transmission may be reduced based on the adjustment to eliminate the transmission power change in the slot for the at least one of the first uplink transmission or the at least one second uplink transmission. For example, 910*a* may be performed by the uplink power control component 1140 in FIG. 11. Referring to FIG. 7, at 714*a*, the UE 702 may transmit, to the base station 704, the at least one of the first uplink transmission on the first uplink channel or the at least one second uplink transmission on the at least one second uplink channel based on the adjusted allocation of the transmission power.

In one configuration, the transmission power for the at least one of the first uplink transmission or the at least one second uplink transmission throughout the slot may be equal to a minimum transmission power for the at least one of the first uplink transmission or the at least one second uplink transmission in the unadjusted allocation of the transmission power.

In one configuration, when the adjustment is associated with a transmission power reduction that is above a first threshold, at 908*b*, the UE may determine not to adjust the allocation of the transmission power for the at least one of the first uplink transmission or the at least one second uplink transmission. The transmission power reduction may correspond to at least a portion of the at least one of the first uplink transmission or the at least one second uplink transmission. For example, 908*b* may be performed by the uplink power control component 1140 in FIG. 11. Referring to FIG. 7, at 712*b*, when the adjustment is associated with a transmission power reduction that is above a first threshold, the UE 702 may determine not to adjust the allocation of the transmission power for the at least one of the first uplink transmission or the at least one second uplink transmission.

At 910*b*, the UE may transmit, to the base station, the at least one of the first uplink transmission on the first uplink channel or the at least one second uplink transmission on the at least one second uplink channel based on the unadjusted allocation of the transmission power. For example, 910*b* may be performed by the uplink power control component 1140 in FIG. 11. Referring to FIG. 7, at 714*b*, the UE 702 may transmit, to the base station 704, the at least one of the first uplink transmission on the first uplink channel or the at least one second uplink transmission on the at least one second uplink channel based on the unadjusted allocation of the transmission power.

In one configuration, when a proportion of the plurality of symbols affected by the transmission power change in the at least one of the first uplink transmission or the at least one second uplink transmission is below a second threshold, at 908*b*, the UE may determine not to adjust the allocation of the transmission power for the at least one of the first uplink transmission or the at least one second uplink transmission. For example, 908*b* may be performed by the uplink power control component 1140 in FIG. 11. Referring to FIG. 7, at 712*b*, when a proportion of the plurality of symbols affected by the transmission power change in the at least one of the first uplink transmission or the at least one second uplink transmission is below a second threshold, the UE 702 may determine not to adjust the allocation of the transmission power for the at least one of the first uplink transmission or the at least one second uplink transmission.

At 910*b*, the UE may transmit, to the base station, the at least one of the first uplink transmission on the first uplink channel or the at least one second uplink transmission on the at least one second uplink channel based on the unadjusted allocation of the transmission power. For example, 910*b* may be performed by the uplink power control component 1140 in FIG. 11. Referring to FIG. 7, at 714*b*, the UE 702 may transmit, to the base station 704, the at least one of the first uplink transmission on the first uplink channel or the at least one second uplink transmission on the at least one second uplink channel based on the unadjusted allocation of the transmission power.

Figure 10:
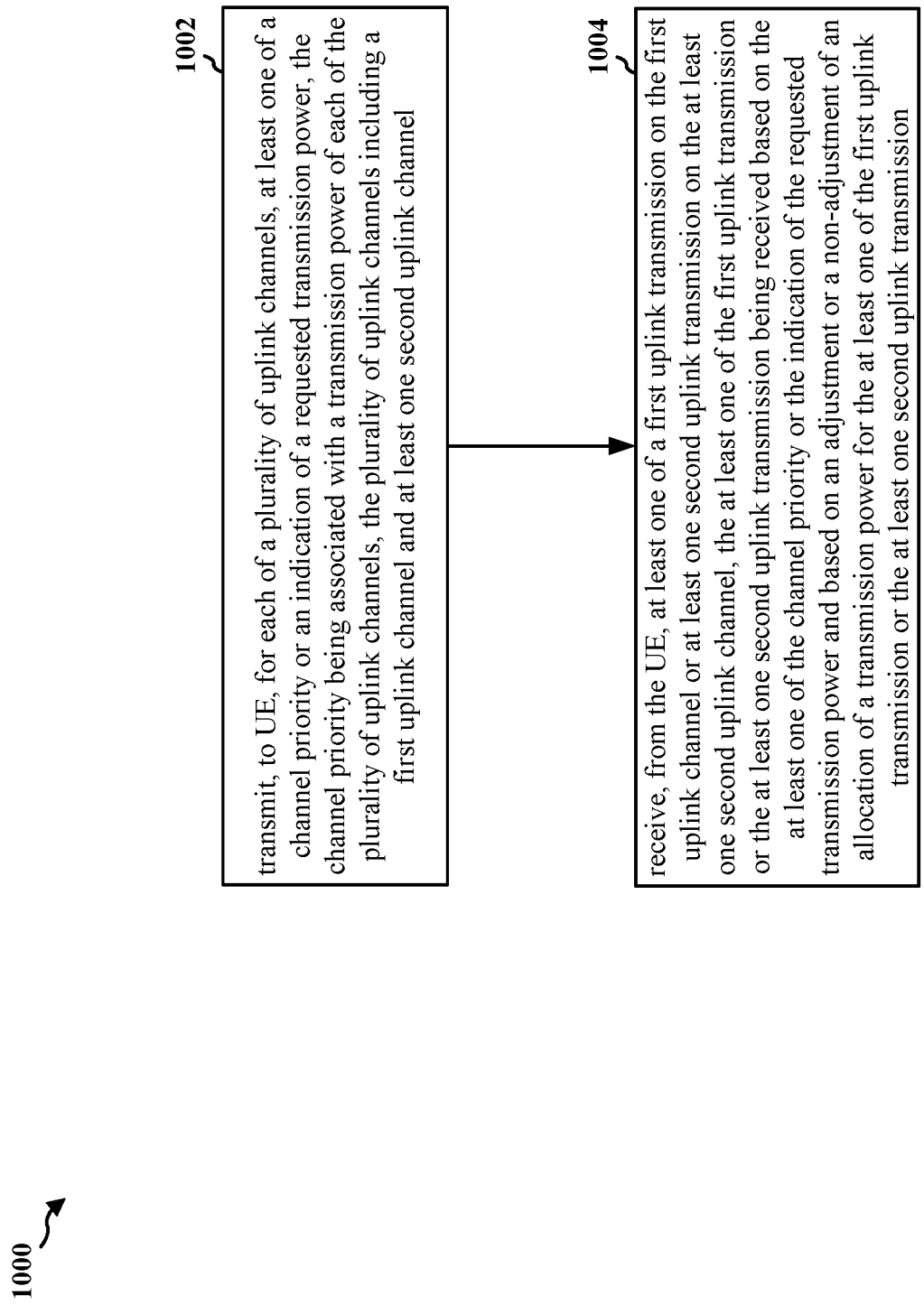
FIG. 10 is a flowchart of a method of wireless communication.

FIG. 10 is a flowchart 1000 of a method of wireless communication. The method may be performed by a base station (e.g., the base station 102/180/310/704; the apparatus 1202). At 1002, the base station may transmit, to a UE, for each of a plurality of uplink channels, at least one of a channel priority or an indication of a requested transmission power. The channel priority may be associated with a transmission power of each of the plurality of uplink channels. The plurality of uplink channels may include a first uplink channel and at least one second uplink channel. For example, 1002 may be performed by the uplink power control component 1240 in FIG. 12. Referring to FIG. 7, at 706, the base station 704 may transmit, to a UE 702, a channel priority of each of a plurality of uplink channels.

At 1004, the base station may receive, from the UE, at least one of a first uplink transmission on the first uplink channel or at least one second uplink transmission on the at least one second uplink channel. The at least one of the first uplink transmission or the at least one second uplink transmission may be received based on the at least one of the channel priority or the indication of the requested transmission power and based on an adjustment or a non-adjustment of an allocation of a transmission power for the at least one of the first uplink transmission or the at least one second uplink transmission. For example, 1004 may be performed by the uplink power control component 1240 in FIG. 12. Referring to FIG. 7, at 714, the base station 704 may receive, from the UE 702, at least one of a first uplink transmission on the first uplink channel or at least one second uplink transmission on the at least one second uplink channel.

In one configuration, the adjustment or the non-adjustment of the allocation of the transmission power for the at least one of the first uplink transmission or the at least one second uplink transmission may be based on an elimination of a transmission power change in the allocation of the transmission power in a slot for the at least one of the first uplink transmission or the at least one second uplink transmission.

In one configuration, the transmission power change in the allocation of the transmission power in the slot for the at least one of the first uplink transmission or the at least one second uplink transmission may be associated with an overlapping between the first uplink transmission and the at least one second uplink transmission over at least a portion of one symbol in the slot.

In one configuration, the allocation of the transmission power for the at least one of the first uplink transmission or the at least one second uplink transmission may be based on the channel priority.

In one configuration, based on the adjustment of the allocation of the transmission power, the transmission power for the at least one of the first uplink transmission or the at least one second uplink transmission throughout a slot may be equal to a minimum transmission power for the at least one of the first uplink transmission or the at least one second uplink transmission prior to the adjustment of the allocation of the transmission power.

In one configuration, the first uplink transmission may correspond to at least one first CC on the first uplink channel and the at least one second uplink transmission corresponds to at least one second CC on the at least one second uplink channel.

Figure 11:
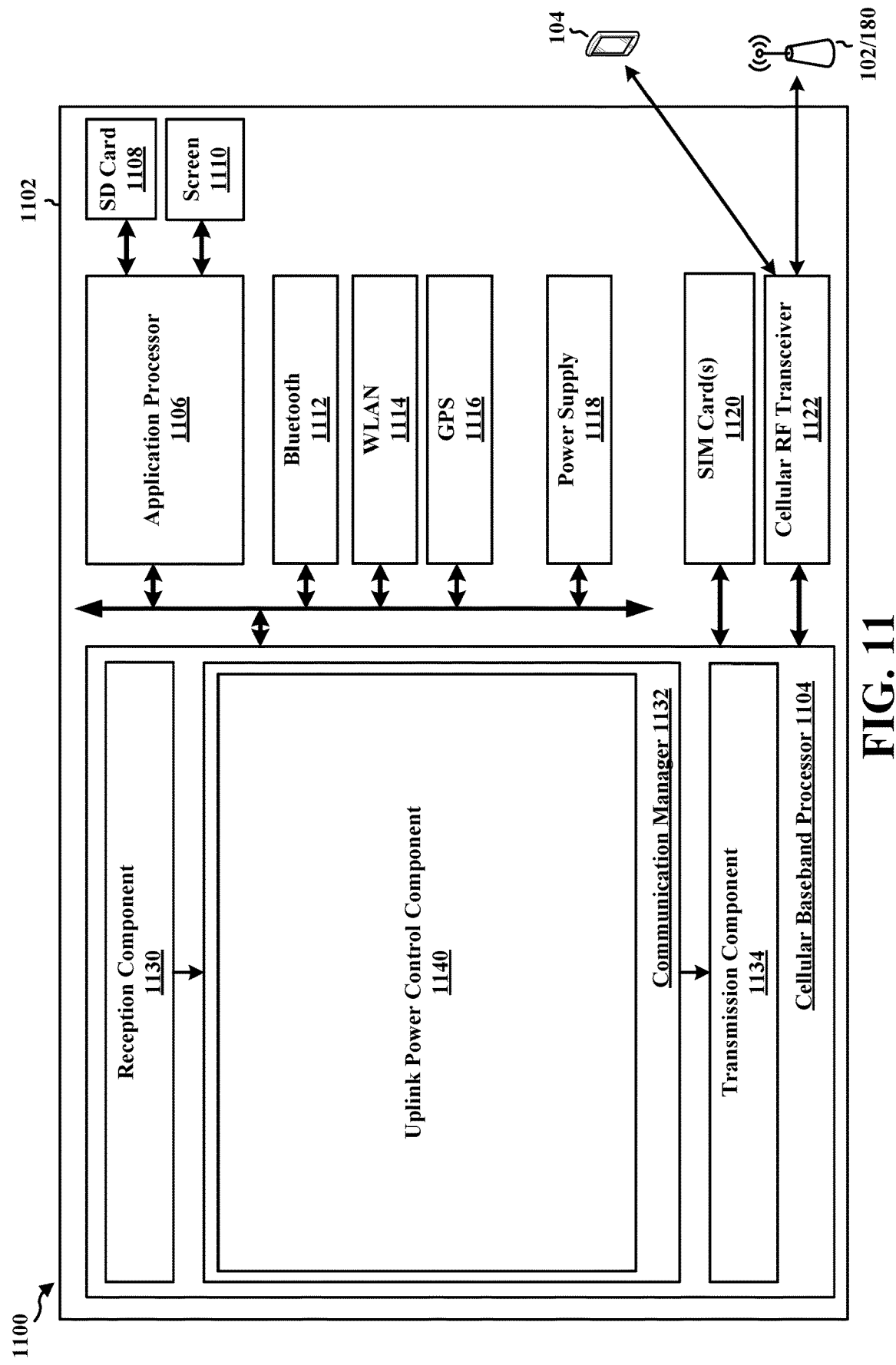
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes an uplink power control component 1140 that may be configured to receive, from the base station, a channel priority of a plurality of uplink channels, e.g., as described in connection with 902 in FIG. 9. The power control component 1140 may be configured to calculate an allocation of a transmission power for a first uplink transmission on a first uplink channel and at least one second uplink transmission on at least one second uplink channel, the transmission power being allocated in each symbol of a plurality of symbols in a slot, e.g., as described in connection with 802 in FIG. 8 and 904 in FIG. 9. The power control component 1140 may be configured to detect a transmission power change in the allocation of the transmission power in the slot for at least one of the first uplink transmission or the at least one second uplink transmission, the transmission power change being associated with an overlapping between the first uplink transmission and the at least one second uplink transmission over at least a portion of one symbol in the slot, e.g., as described in connection with 804 in FIG. 8 and 906 in FIG. 9. The power control component 1140 may be configured to determine whether to adjust the allocation of the transmission power for the at least one of the first uplink transmission or the at least one second uplink transmission to eliminate the transmission power change in the slot for the at least one of the first uplink transmission or the at least one second uplink transmission, e.g., as described in connection with 806 in FIG. 8 and 908 in FIG. 9. The power control component 1140 may be configured to determine to adjust the allocation of the transmission power for the at least one of the first uplink transmission or the at least one second uplink transmission to eliminate the transmission power change in the slot for the at least one of the first uplink transmission or the at least one second uplink transmission, e.g., as described in connection with 908*a* in FIG. 9. The power control component 1140 may be configured to determine not to adjust the allocation of the transmission power for the at least one of the first uplink transmission or the at least one second uplink transmission, e.g., as described in connection with 908*b* in FIG. 9. The power control component 1140 may be configured to transmit, to a base station, the at least one of the first uplink transmission on the first uplink channel or the at least one second uplink transmission on the at least one second uplink channel based on an adjusted or an unadjusted allocation of the transmission power based on the determination, e.g., as described in connection with 808 in FIG. 8 and 910 in FIG. 9. The power control component 1140 may be configured to transmit, to the base station, the at least one of the first uplink transmission on the first uplink channel or the at least one second uplink transmission on the at least one second uplink channel based on the adjusted allocation of the transmission power, e.g., as described in connection with 910*a* in FIG. 9. The power control component 1140 may be configured to transmit, to the base station, the at least one of the first uplink transmission on the first uplink channel or the at least one second uplink transmission on the at least one second uplink channel based on the unadjusted allocation of the transmission power, e.g., as described in connection with 910*b* in FIG. 9.

The apparatus may include additional components that perform each of the blocks of the algorithm in the flowcharts of FIGS. 7-9. As such, each block in the flowcharts of FIGS. 7-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for calculating an allocation of a transmission power for a first uplink transmission on a first uplink channel and at least one second uplink transmission on at least one second uplink channel. The transmission power may be allocated in each symbol of a plurality of symbols in a slot. The apparatus 1102 may include means for detecting a transmission power change in the allocation of the transmission power in the slot for at least one of the first uplink transmission or the at least one second uplink transmission. The transmission power change may be associated with an overlapping between the first uplink transmission and the at least one second uplink transmission over at least a portion of one symbol in the slot. The apparatus 1102 may include means for determining whether to adjust the allocation of the transmission power for the at least one of the first uplink transmission or the at least one second uplink transmission to eliminate the transmission power change in the slot for the at least one of the first uplink transmission or the at least one second uplink transmission. The apparatus 1102 may include means for transmitting, to a base station, the at least one of the first uplink transmission on the first uplink channel or the at least one second uplink transmission on the at least one second uplink channel based on an adjusted or an unadjusted allocation of the transmission power based on the determination.

In one configuration, the apparatus 1102 may include means for receiving, from the base station, for each of a plurality of uplink channels, at least one of a channel priority or an indication of a requested transmission power. The channel priority may be associated with a transmission power of each of the plurality of uplink channels. The plurality of uplink channels may include the first uplink channel and the at least one second uplink channel. In one configuration, the transmission power may be allocated based on the at least one of the channel priority or the indication of the requested transmission power. In one configuration, the first uplink transmission may correspond to at least one first CC on the first uplink channel and the at least one second uplink transmission may correspond to at least one second CC on the at least one second uplink channel. In one configuration, the apparatus 1102 may include means for adjusting the allocation of the transmission power for the at least one of the first uplink transmission or the at least one second uplink transmission to eliminate the transmission power change in the slot for the at least one of the first uplink transmission or the at least one second uplink transmission. The apparatus 1102 may include means for transmitting, to the base station, the at least one of the first uplink transmission on the first uplink channel or the at least one second uplink transmission on the at least one second uplink channel based on the adjusted allocation of the transmission power. The transmission power for at least one symbol in the slot for the at least one of the first uplink transmission or the at least one second uplink transmission may be reduced based on the adjustment to eliminate the transmission power change in the slot for the at least one of the first uplink transmission or the at least one second uplink transmission. In one configuration, the transmission power for the at least one of the first uplink transmission or the at least one second uplink transmission throughout the slot may be equal to a minimum transmission power for the at least one of the first uplink transmission or the at least one second uplink transmission in the unadjusted allocation of the transmission power. In one configuration, when the adjustment is associated with a transmission power reduction that is above a first threshold, the apparatus 1102 may include means for determining not to adjust the allocation of the transmission power for the at least one of the first uplink transmission or the at least one second uplink transmission. The transmission power reduction may correspond to at least a portion of the at least one of the first uplink transmission or the at least one second uplink transmission. The apparatus 1102 may include means for transmitting, to the base station, the at least one of the first uplink transmission on the first uplink channel or the at least one second uplink transmission on the at least one second uplink channel based on the unadjusted allocation of the transmission power. In one configuration, when a proportion of the plurality of symbols affected by the transmission power change in the at least one of the first uplink transmission or the at least one second uplink transmission is below a second threshold, the apparatus 1102 may include means for determining not to adjust the allocation of the transmission power for the at least one of the first uplink transmission or the at least one second uplink transmission. The apparatus 1102 may include means for transmitting, to the base station, the at least one of the first uplink transmission on the first uplink channel or the at least one second uplink transmission on the at least one second uplink channel based on the unadjusted allocation of the transmission power.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
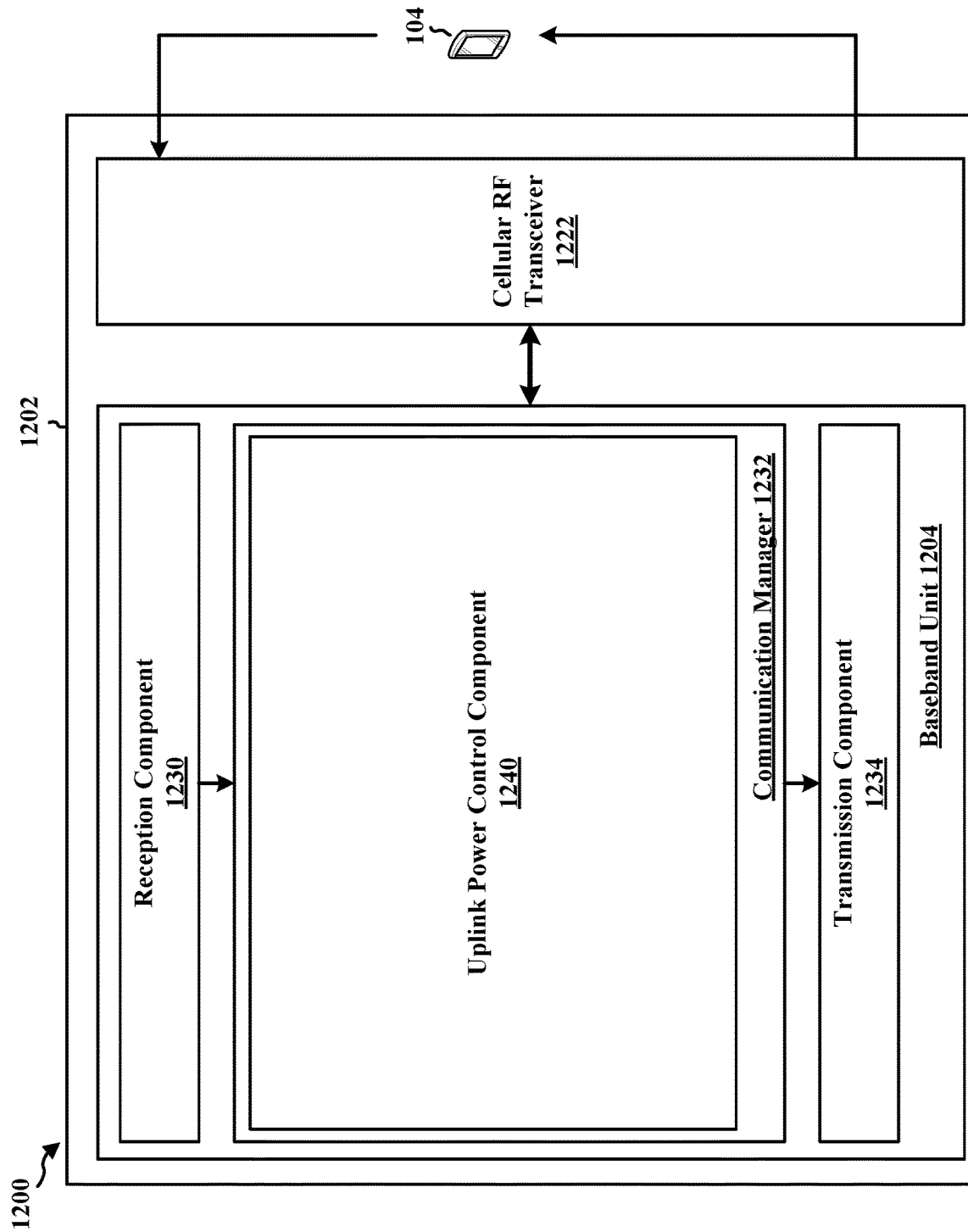
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes an uplink power control component 1240 that may be configured to transmit, to a UE, for each of a plurality of uplink channels, at least one of a channel priority or an indication of a requested transmission power, the channel priority being associated with a transmission power of each of the plurality of uplink channels, the plurality of uplink channels including a first uplink channel and at least one second uplink channel, e.g., as described in connection with 1002 in FIG. 10. The uplink power control component 1240 may be configured to receive, from the UE, at least one of a first uplink transmission on the first uplink channel or at least one second uplink transmission on the at least one second uplink channel, the at least one of the first uplink transmission or the at least one second uplink transmission being received based on the at least one of the channel priority or the indication of the requested transmission power and based on an adjustment or a non-adjustment of an allocation of a transmission power for the at least one of the first uplink transmission or the at least one second uplink transmission, e.g., as described in connection with 1004 in FIG. 10.

The apparatus may include additional components that perform each of the blocks of the algorithm in the flowcharts of FIGS. 7 and 10. As such, each block in the flowcharts of FIGS. 7 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for transmitting, to a UE, for each of a plurality of uplink channels, at least one of a channel priority or an indication of a requested transmission power. The channel priority may be associated with a transmission power of each of the plurality of uplink channels. The plurality of uplink channels may include a first uplink channel and at least one second uplink channel. The apparatus 1202 may include means for receiving, from the UE, at least one of a first uplink transmission on the first uplink channel or at least one second uplink transmission on the at least one second uplink channel. The at least one of the first uplink transmission or the at least one second uplink transmission may be received based on the at least one of the channel priority or the indication of the requested transmission power and based on an adjustment or a non-adjustment of an allocation of a transmission power for the at least one of the first uplink transmission or the at least one second uplink transmission.

In one configuration, the adjustment or the non-adjustment of the allocation of the transmission power for the at least one of the first uplink transmission or the at least one second uplink transmission may be based on an elimination of a transmission power change in the allocation of the transmission power in a slot for the at least one of the first uplink transmission or the at least one second uplink transmission. In one configuration, the transmission power change in the allocation of the transmission power in the slot for the at least one of the first uplink transmission or the at least one second uplink transmission may be associated with an overlapping between the first uplink transmission and the at least one second uplink transmission over at least a portion of one symbol in the slot. In one configuration, the allocation of the transmission power for the at least one of the first uplink transmission or the at least one second uplink transmission may be based on the channel priority. In one configuration, based on the adjustment of the allocation of the transmission power, the transmission power for the at least one of the first uplink transmission or the at least one second uplink transmission throughout a slot may be equal to a minimum transmission power for the at least one of the first uplink transmission or the at least one second uplink transmission prior to the adjustment of the allocation of the transmission power. In one configuration, the first uplink transmission may correspond to at least one first CC on the first uplink channel and the at least one second uplink transmission corresponds to at least one second CC on the at least one second uplink channel.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

According to aspects described herein, the UE may calculate an allocation of a transmission power for a first uplink transmission on a first uplink channel and at least one second uplink transmission on at least one second uplink channel. The transmission power may be allocated in each symbol of a plurality of symbols in a slot. The UE may detect a transmission power change in the allocation of the transmission power in the slot for at least one of the first uplink transmission or the at least one second uplink transmission. The transmission power change may be associated with an overlapping between the first uplink transmission and the at least one second uplink transmission over at least a portion of one symbol in the slot. The UE may determine whether to adjust the allocation of the transmission power for the at least one of the first uplink transmission or the at least one second uplink transmission to eliminate the transmission power change in the slot for the at least one of the first uplink transmission or the at least one second uplink transmission. The UE may transmit, to a base station, the at least one of the first uplink transmission on the first uplink channel or the at least one second uplink transmission on the at least one second uplink channel based on an adjusted or an unadjusted allocation of the transmission power based on the determination. Therefore, in a multiple CC scenario where channel transmissions on different CCs may overlap in time, an in-slot transmission power change in a channel transmission on a CC may be eliminated, and accordingly the full channel transmission may be decodable.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to calculate an allocation of a transmission power for a first uplink transmission on a first uplink channel and at least one second uplink transmission on at least one second uplink channel, the transmission power being allocated in each symbol of a plurality of symbols in a slot; detect a transmission power change in the allocation of the transmission power in the slot for at least one of the first uplink transmission or the at least one second uplink transmission, the transmission power change being associated with an overlapping between the first uplink transmission and the at least one second uplink transmission over at least a portion of one symbol in the slot; determine whether to adjust the allocation of the transmission power for the at least one of the first uplink transmission or the at least one second uplink transmission to eliminate the transmission power change in the slot for the at least one of the first uplink transmission or the at least one second uplink transmission; and transmit, to a base station, the at least one of the first uplink transmission on the first uplink channel or the at least one second uplink transmission on the at least one second uplink channel based on an adjusted or an unadjusted allocation of the transmission power based on the determination.

Aspect 2 is the apparatus of aspect 1, the at least one processor being further configured to: receive, from the base station, for each of a plurality of uplink channels, at least one of a channel priority or an indication of a requested transmission power, where the channel priority is associated with a transmission power of each of the plurality of uplink channels, and the plurality of uplink channels includes the first uplink channel and the at least one second uplink channel.

Aspect 3 is the apparatus of aspect 2, where the transmission power is allocated based on the at least one of the channel priority or the indication of the requested transmission power.

Aspect 4 is the apparatus of any of aspects 1 to 3, where the first uplink transmission corresponds to at least one first CC on the first uplink channel and the at least one second uplink transmission corresponds to at least one second CC on the at least one second uplink channel.

Aspect 5 is the apparatus of any of aspects 1 to 4, the at least one processor being further configured to: determine to adjust the allocation of the transmission power for the at least one of the first uplink transmission or the at least one second uplink transmission to eliminate the transmission power change in the slot for the at least one of the first uplink transmission or the at least one second uplink transmission; and transmit, to the base station, the at least one of the first uplink transmission on the first uplink channel or the at least one second uplink transmission on the at least one second uplink channel based on the adjusted allocation of the transmission power, where the transmission power for at least one symbol in the slot for the at least one of the first uplink transmission or the at least one second uplink transmission is reduced based on the adjustment to eliminate the transmission power change in the slot for the at least one of the first uplink transmission or the at least one second uplink transmission.

Aspect 6 is the apparatus of aspect 5, where the transmission power for the at least one of the first uplink transmission or the at least one second uplink transmission throughout the slot is equal to a minimum transmission power for the at least one of the first uplink transmission or the at least one second uplink transmission in the unadjusted allocation of the transmission power.

Aspect 7 is the apparatus of any of aspects 1 to 4, the at least one processor being further configured to: determine not to adjust the allocation of the transmission power for the at least one of the first uplink transmission or the at least one second uplink transmission when the adjustment is associated with a transmission power reduction that is above a first threshold, the transmission power reduction corresponding to at least a portion of the at least one of the first uplink transmission or the at least one second uplink transmission; and transmit, to the base station, the at least one of the first uplink transmission on the first uplink channel or the at least one second uplink transmission on the at least one second uplink channel based on the unadjusted allocation of the transmission power.

Aspect 8 is the apparatus of any of aspects 1 to 4, the at least one processor being further configured to: determine not to adjust the allocation of the transmission power for the at least one of the first uplink transmission or the at least one second uplink transmission when a proportion of the plurality of symbols affected by the transmission power change in the at least one of the first uplink transmission or the at least one second uplink transmission is below a second threshold; and transmit, to the base station, the at least one of the first uplink transmission on the first uplink channel or the at least one second uplink transmission on the at least one second uplink channel based on the unadjusted allocation of the transmission power.

Aspect 9 is the apparatus of any of aspects 1 to 8, further including a transceiver coupled to the at least one processor.

Aspect 10 is an apparatus for wireless communication at a base station including at least one processor coupled to a memory and configured to transmit, to a UE, for each of a plurality of uplink channels, at least one of a channel priority or an indication of a requested transmission power, the channel priority being associated with a transmission power of each of the plurality of uplink channels, the plurality of uplink channels including a first uplink channel and at least one second uplink channel; and receive, from the UE, at least one of a first uplink transmission on the first uplink channel or at least one second uplink transmission on the at least one second uplink channel, the at least one of the first uplink transmission or the at least one second uplink transmission being received based on the at least one of the channel priority or the indication of the requested transmission power and based on an adjustment or a non-adjustment of an allocation of a transmission power for the at least one of the first uplink transmission or the at least one second uplink transmission.

Aspect 11 is the apparatus of aspect 10, where the adjustment or the non-adjustment of the allocation of the transmission power for the at least one of the first uplink transmission or the at least one second uplink transmission is based on an elimination of a transmission power change in the allocation of the transmission power in a slot for the at least one of the first uplink transmission or the at least one second uplink transmission.

Aspect 12 is the apparatus of aspect 11, where the transmission power change in the allocation of the transmission power in the slot for the at least one of the first uplink transmission or the at least one second uplink transmission is associated with an overlapping between the first uplink transmission and the at least one second uplink transmission over at least a portion of one symbol in the slot.

Aspect 13 is the apparatus of any of aspects 10 to 12, where the allocation of the transmission power for the at least one of the first uplink transmission or the at least one second uplink transmission is based on the channel priority.

Aspect 14 is the apparatus of any of aspects 10 to 13, where based on the adjustment of the allocation of the transmission power, the transmission power for the at least one of the first uplink transmission or the at least one second uplink transmission throughout a slot is equal to a minimum transmission power for the at least one of the first uplink transmission or the at least one second uplink transmission prior to the adjustment of the allocation of the transmission power.

Aspect 15 is the apparatus of any of aspects 10 to 14, where the first uplink transmission corresponds to at least one first CC on the first uplink channel and the at least one second uplink transmission corresponds to at least one second CC on the at least one second uplink channel.

Aspect 16 is the apparatus of any of aspects 10 to 15, further including a transceiver coupled to the at least one processor.

Aspect 17 is a method of wireless communication for implementing any of aspects 1 to 16.

Aspect 18 is an apparatus for wireless communication including means for implementing any of aspects 1 to 16.

Aspect 19 is a computer-readable medium storing computer executable code, where the code when executed by a processor causes the processor to implement any of aspects 1 to 16.

What is claimed is:

1. A user equipment (UE), comprising:
   a memory; and
   at least one processor coupled to the memory, wherein the UE is configured to:
   detect a transmission power change in an allocation of a transmission power in a slot for at least one of a first uplink transmission or at least one second uplink transmission, wherein the transmission power change being is associated with an overlapping between the first uplink transmission and the at least one second uplink transmission, the overlap being within at least a portion of at least one symbol in the slot;
   determine, based on an effect of the transmission power change for decoding of the at least one of the first uplink transmission or the at least one second uplink transmission, whether to adjust the allocation of the transmission power for the at least one of the first uplink transmission or the at least one second uplink transmission to eliminate the transmission power change in the slot for the at least one of the first uplink transmission or the at least one second uplink transmission; and
   transmit, to a base station, the at least one of the first uplink transmission on a first uplink channel or the at least one second uplink transmission on at least one second uplink channel based on an adjusted allocation or an unadjusted allocation of the transmission power based on the determination.

2. The UE of claim 1, wherein the UE is further configured to:
   receive, from the base station, for each of a plurality of uplink channels, at least one of a channel priority associated with the transmission power of each of the plurality of uplink channels or an indication of a requested transmission power, wherein the plurality of uplink channels includes the first uplink channel and the at least one second uplink channel.

3. The UE of claim 2, wherein the transmission power is allocated based on at least one of the channel priority or the indication of the requested transmission power.

4. The UE of claim 1, wherein the first uplink transmission corresponds to at least one first component carrier (CC) on the first uplink channel and the at least one second uplink transmission corresponds to at least one second CC on the at least one second uplink channel.

5. The UE of claim 1, wherein the UE is configured to:
determine to adjust the allocation of the transmission power for the at least one of the first uplink transmission or the at least one second uplink transmission to eliminate the transmission power change in the slot for the at least one of the first uplink transmission or the at least one second uplink transmission; and
transmit, to the base station, the at least one of the first uplink transmission on the first uplink channel or the at least one second uplink transmission on the at least one second uplink channel based on the adjusted allocation of the transmission power,
wherein the transmission power for one or more symbol in the slot for the at least one of the first uplink transmission or the at least one second uplink transmission is reduced based on an adjustment to eliminate the transmission power change in the slot for the at least one of the first uplink transmission or the at least one second uplink transmission.

6. The apparatus UE of claim 5, wherein the transmission power for the at least one of the first uplink transmission or the at least one second uplink transmission throughout the slot is equal to a minimum transmission power for the at least one of the first uplink transmission or the at least one second uplink transmission in the unadjusted allocation of the transmission power.

7. The UE of claim 1, wherein the UE is configured to:
determine not to adjust the allocation of the transmission power for the at least one of the first uplink transmission or the at least one second uplink transmission when an adjustment is associated with a transmission power reduction that is above a first threshold, the transmission power reduction corresponding to at least the portion of the at least one of the first uplink transmission or the at least one second uplink transmission; and
transmit, to the base station, the at least one of the first uplink transmission on the first uplink channel or the at least one second uplink transmission on the at least one second uplink channel based on the unadjusted allocation of the transmission power.

8. The UE of claim 1, wherein the UE is configured to:
determine not to adjust the allocation of the transmission power for the at least one of the first uplink transmission or the at least one second uplink transmission when a proportion of a plurality of symbols affected by the transmission power change in the at least one of the first uplink transmission or the at least one second uplink transmission is below a threshold; and
transmit, to the base station, the at least one of the first uplink transmission on the first uplink channel or the at least one second uplink transmission on the at least one second uplink channel based on the unadjusted allocation of the transmission power.

9. The UE of claim 1, further comprising a transceiver coupled to the at least one processor.

10. A method of wireless communication at a user equipment (UE), comprising:
detecting a transmission power change in an allocation of a transmission power in a slot for at least one of a first uplink transmission or at least one second uplink transmission, wherein the transmission power change is associated with an overlapping between the first uplink transmission and the at least one second uplink transmission, the overlap being within at least a portion of at least one symbol in the slot;
determining, based on an effect of the transmission power change for decoding of the at least one of the first uplink transmission or the at least one second uplink transmission, whether to adjust the allocation of the transmission power for the at least one of the first uplink transmission or the at least one second uplink transmission to eliminate the transmission power change in the slot for the at least one of the first uplink transmission or the at least one second uplink transmission; and
transmitting, to a base station, the at least one of the first uplink transmission on a first uplink channel or the at least one second uplink transmission on at least one second uplink channel based on an adjusted allocation or an unadjusted allocation of the transmission power based on the determination.

11. The method of claim 10, further comprising:
receiving, from the base station, for each of a plurality of uplink channels, at least one of a channel priority associated with the transmission power of each of the plurality of uplink channels or an indication of a requested transmission power, wherein the plurality of uplink channels includes the first uplink channel and the at least one second uplink channel.

12. The method of claim 11, wherein the transmission power is allocated based on the at least one of the channel priority or the indication of the requested transmission power.

13. The method of claim 10, wherein the first uplink transmission corresponds to at least one first component carrier (CC) on the first uplink channel and the at least one second uplink transmission corresponds to at least one second CC on the at least one second uplink channel.

14. The method of claim 10, further comprising:
determining to adjust the allocation of the transmission power for the at least one of the first uplink transmission or the at least one second uplink transmission to eliminate the transmission power change in the slot for the at least one of the first uplink transmission or the at least one second uplink transmission; and
transmitting, to the base station, the at least one of the first uplink transmission on the first uplink channel or the at least one second uplink transmission on the at least one second uplink channel based on the adjusted allocation of the transmission power,
wherein the transmission power for at least one or more symbol in the slot for the at least one of the first uplink transmission or the at least one second uplink transmission is reduced based on an adjustment to eliminate the transmission power change in the slot for the at least one of the first uplink transmission or the at least one second uplink transmission.

15. The method of claim 14, wherein the transmission power for the at least one of the first uplink transmission or the at least one second uplink transmission throughout the slot is equal to a minimum transmission power for the at least one of the first uplink transmission or the at least one second uplink transmission in the unadjusted allocation of the transmission power.

16. The method of claim 10, further comprising:
determining not to adjust the allocation of the transmission power for the at least one of the first uplink transmission or the at least one second uplink transmission when an adjustment is associated with a transmission power reduction that is above a first threshold, the transmission power reduction corresponding to at least the portion of the at least one of the first uplink transmission or the at least one second uplink transmission; and transmitting, to the base station, the at least one of the first uplink transmission on the first uplink channel or the at least one second uplink transmission on the at least one second uplink channel based on the unadjusted allocation of the transmission power.

17. The method of claim 10, further comprising:
determining not to adjust the allocation of the transmission power for the at least one of the first uplink transmission or the at least one second uplink transmission when a proportion of plurality of symbols affected by the transmission power change in the at least one of the first uplink transmission or the at least one second uplink transmission is below a threshold; and transmitting, to the base station, the at least one of the first uplink transmission on the first uplink channel or the at least one second uplink transmission on the at least one second uplink channel based on the unadjusted allocation of the transmission power.

18. A base station for wireless communication, comprising:
memory; and
at least one processor coupled to the memory, wherein the base station is configured to:
transmit, to a user equipment (UE), for each of a plurality of uplink channels, at least one of a channel priority associated with a transmission power of each of the plurality of uplink channels or an indication of a requested transmission power, the plurality of uplink channels including a first uplink channel and at least one second uplink channel; and
receive, from the UE, at least one of a first uplink transmission on the first uplink channel or at least one second uplink transmission on the at least one second uplink channel, the at least one of the first uplink transmission or the at least one second uplink transmission being received based on the at least one of the channel priority or the indication of the requested transmission power and based on an adjustment of an allocation of the transmission power for the at least one of the first uplink transmission or the at least one second uplink transmission, wherein the adjustment of the allocation of the transmission power is such that the transmission power for the at least one of the first uplink transmission or the at least one second uplink transmission is constant throughout a duration of the at least one of the first uplink transmission or the at least one second uplink transmission.

19. The base station of claim 18, wherein the adjustment of the allocation of the transmission power for the at least one of the first uplink transmission or the at least one second uplink transmission is based on an elimination of a transmission power change in the allocation of the transmission power in a slot for the at least one of the first uplink transmission or the at least one second uplink transmission.

20. The base station of claim 19, wherein the transmission power change in the allocation of the transmission power in the slot for the at least one of the first uplink transmission or the at least one second uplink transmission is associated with an overlap between the first uplink transmission and the at least one second uplink transmission, the overlap being within at least a portion of at least one symbol in the slot.

21. The base station of claim 18, wherein the allocation of the transmission power for the at least one of the first uplink transmission or the at least one second uplink transmission is based on the channel priority.

22. The base station of claim 18, wherein based on the adjustment of the allocation of the transmission power, the transmission power for the at least one of the first uplink transmission or the at least one second uplink transmission throughout a slot is equal to a minimum transmission power for the at least one of the first uplink transmission or the at least one second uplink transmission prior to the adjustment of the allocation of the transmission power.

23. The base station of claim 18, wherein the first uplink transmission corresponds to at least one first component carrier (CC) on the first uplink channel and the at least one second uplink transmission corresponds to at least one second CC on the at least one second uplink channel.

24. The apparatus base station of claim 18, further comprising a transceiver coupled to the at least one processor.

25. A method of wireless communication at a base station, comprising:
transmitting, to a user equipment (UE), for each of a plurality of uplink channels, at least one of a channel priority associated with a transmission power of each of the plurality of uplink channels or an indication of a requested transmission power, the plurality of uplink channels including a first uplink channel and at least one second uplink channel; and
receiving, from the UE, at least one of a first uplink transmission on the first uplink channel or at least one second uplink transmission on the at least one second uplink channel, the at least one of the first uplink transmission or the at least one second uplink transmission being received based on the at least one of the channel priority or the indication of the requested transmission power and based on an adjustment of an allocation of the transmission power for the at least one of the first uplink transmission or the at least one second uplink transmission, wherein the adjustment of the allocation of the transmission power is such that the transmission power for the at least one of the first uplink transmission or the at least one second uplink transmission is constant throughout a duration of the at least one of the first uplink transmission or the at least one second uplink transmission.

26. The method of claim 25, wherein the adjustment of the allocation of the transmission power for the at least one of the first uplink transmission or the at least one second uplink transmission is based on an elimination of a transmission power change in the allocation of the transmission power in a slot for the at least one of the first uplink transmission or the at least one second uplink transmission.

27. The method of claim 26, wherein the transmission power change in the allocation of the transmission power in the slot for the at least one of the first uplink transmission or the at least one second uplink transmission is associated with an overlap between the first uplink transmission and the at least one second uplink transmission, the overlap being within at least a portion of at least one symbol in the slot.

28. The method of claim 25, wherein the allocation of the transmission power for the at least one of the first uplink transmission or the at least one second uplink transmission is based on the channel priority.

29. The method of claim 25, wherein based on the adjustment of the allocation of the transmission power, the transmission power for the at least one of the first uplink transmission or the at least one second uplink transmission throughout a slot is equal to a minimum transmission power for the at least one of the first uplink transmission or the at least one second uplink transmission prior to the adjustment of the allocation of the transmission power.

30. The method of claim 25, wherein the first uplink transmission corresponds to at least one first component carrier (CC) on the first uplink channel and the at least one second uplink transmission corresponds to at least one second CC on the at least one second uplink channel.

31. The UE of claim 1, wherein the UE is configured to:
- transmit the at least one of the first uplink transmission or the at least one second uplink transmission with the transmission power change when an adjustment is associated with a transmission power reduction that is above a first threshold or a proportion of a plurality of symbols affected by the transmission power change in the at least one of the first uplink transmission or the at least one second uplink transmission is below a second threshold; and
- adjust the allocation of the transmission power to eliminate the transmission power change when the adjustment is associated with the transmission power reduction that is below the first threshold or the proportion of the plurality of symbols affected by the transmission power change in the at least one of the first uplink transmission or the at least one second uplink transmission is above the second threshold.

* * * * *